United States Patent
Aronowitz

(10) Patent No.: US 7,509,257 B2
(45) Date of Patent: Mar. 24, 2009

(54) METHOD AND APPARATUS FOR ADAPTING REFERENCE TEMPLATES

(75) Inventor: Hagai Aronowitz, Petah Tiqwa (IL)

(73) Assignee: Marvell International Ltd., Hamilton (BM)

(*) Notice: Subject to any disclaimer, the term of this patent is extended or adjusted under 35 U.S.C. 154(b) by 1109 days.

(21) Appl. No.: 10/327,058

(22) Filed: Dec. 24, 2002

(65) Prior Publication Data
US 2004/0122669 A1   Jun. 24, 2004

(51) Int. Cl.
*G10L 15/00*   (2006.01)

(52) U.S. Cl. .................. 704/244; 704/251; 704/241

(58) Field of Classification Search .......... 704/238, 704/239
See application file for complete search history.

(56) References Cited

U.S. PATENT DOCUMENTS

| | | | |
|---|---|---|---|
| 5,164,990 A | 11/1992 | Pazienti et al. | |
| 5,651,094 A * | 7/1997 | Takagi et al. ............ | 704/244 |
| 5,794,190 A | 8/1998 | Linggard et al. | |
| 5,835,890 A * | 11/1998 | Matsui et al. ........... | 704/255 |
| 6,182,037 B1 | 1/2001 | Maes | |
| 6,278,972 B1 | 8/2001 | Bi et al. | |
| 6,304,844 B1 | 10/2001 | Pan et al. | |
| 6,321,195 B1 | 11/2001 | Lee et al. | |
| 6,401,063 B1 * | 6/2002 | Hebert et al. .......... | 704/234 |
| 6,519,561 B1 * | 2/2003 | Farrell et al. ........... | 704/232 |
| 6,591,237 B2 * | 7/2003 | Erell .................... | 704/251 |
| 6,735,563 B1 * | 5/2004 | Bi ....................... | 704/241 |
| 6,760,701 B2 * | 7/2004 | Sharma et al. ......... | 704/249 |
| 7,050,973 B2 * | 5/2006 | Aronowitz ............. | 704/246 |
| 7,171,360 B2 * | 1/2007 | Huang et al. .......... | 704/245 |
| 2002/0178004 A1 * | 11/2002 | Chang et al. .......... | 704/246 |

OTHER PUBLICATIONS

U.S. Appl. No. 10/128,725, filed Apr. 22, 2002, Hagai Aronowitz.

* cited by examiner

*Primary Examiner*—Talivaldis I Smits
*Assistant Examiner*—Greg A Borsetti

(57) ABSTRACT

A method and apparatus for adapting reference templates is provided. The method includes adapting one or more reference templates using a stored test utterance by replacing data within at the reference templates with a weighted interpolation of that data and corresponding data within the test utterance.

20 Claims, 4 Drawing Sheets

METHOD AND APPARATUS FOR ADAPTING REFERENCE TEMPLATES

BACKGROUND OF THE INVENTION

Speaker dependent systems, such as speaker verification and speaker-dependent speech recognition, are trained by a specific user who will be using the system. During the training process, speech models are created. These systems are usually capable of achieving a relatively high rate of recognition. The rate of recognition is determined according to the number of incidences of accepting a spoken word that should have been rejected or rejecting a spoken word that should have been accepted. However, over time the voice of the user changes and therefore the rate of recognition of the system may then decrease below an acceptable level.

Speaker adaptation refers to the process of adapting speaker-dependent speech models obtained by the user so that they more accurately model the changes in the user's voice. Two types of models that may be used in speaker verification and speech recognition systems: stochastic models such as the Hidden Markov Model (HMM) and template models, such as dynamic time warping (DTW).

In the HMM method, the continuous changes in the user's voice may be taken into consideration to adapt the HMM speech models using maximum a-posteliori (MAP) adaptation. In contrast, conventional DTW processes do not perform adaptation of the DTW speech models (reference templates) due to the non-statistical nature of the DTW method.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
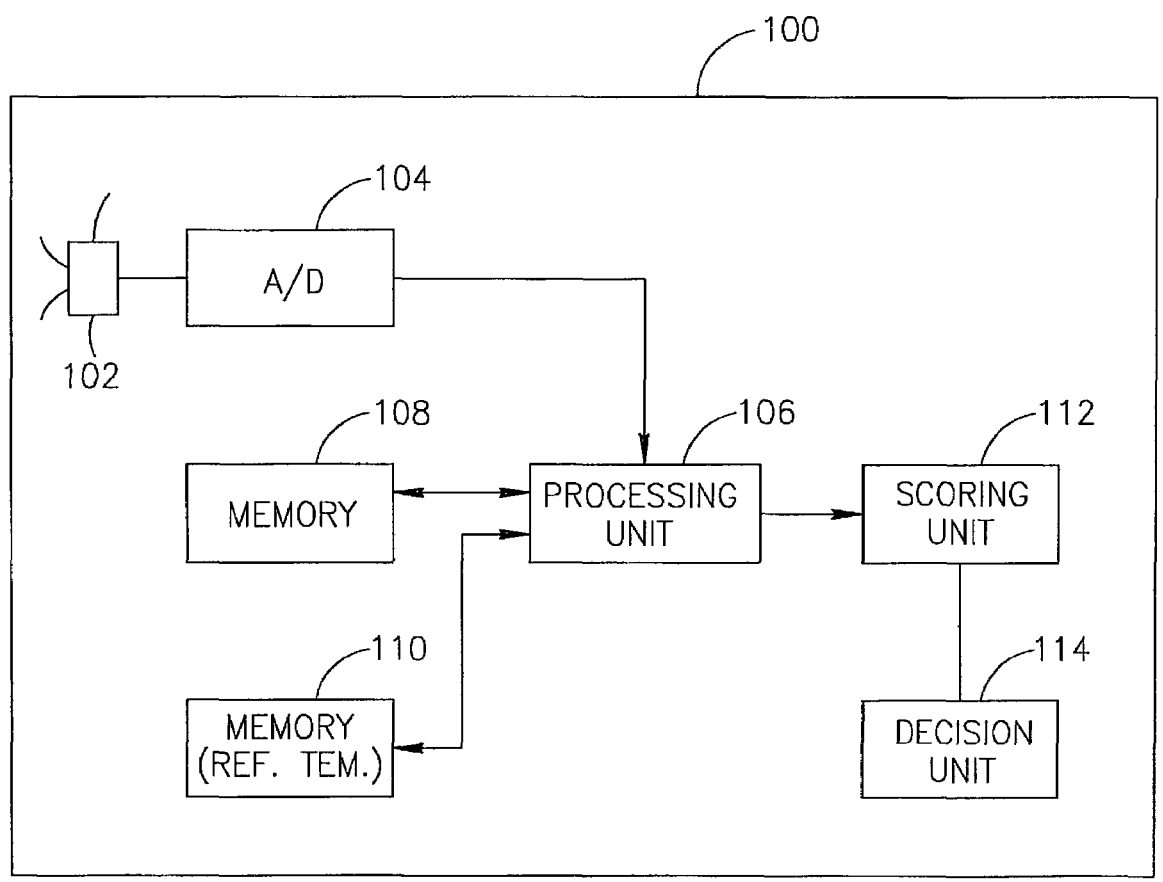
FIG. 1 is a simplified block-diagram illustration of an apparatus having an adaptation system according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Some embodiments of the present invention illustrate an apparatus and method for speaker adaptation of the reference templates of a Dynamic Time Warp (DTW) application. It should be understood that the present invention may be used in a variety of applications. The apparatus and method for speaker adaptation may be implemented, for example, as part of a text dependent speaker verification system or a speaker dependent speech recognition system, and may be suitable for use in noisy environments such as mobile communications.

Although the present invention is not limited in this respect, and the adaptation method and system disclosed herein may be implemented in many devices, it may be applicable, for example, to wireless, handheld and portable communication devices. By way of example, wireless, handheld and portable communication devices may include wireless and cellular telephones, smart telephones, personal digital assistants (PDAs), web-tablets and any device that may provide wireless access to a network such as, for example, an intranet or the Internet.

FIG. 1 is a simplified block-diagram illustration of an exemplary system for speaker verification or speech recognition having an adaptation system according to some embodiments of the present invention. A speech recognition and/or speaker verification system 100 may comprise a speech input device 102, an analog-to-digital converter (ADC) 104 and a processing unit 106. Speech input device 102 may be, for example, a microphone to acquire a speech reference utterance for training and to acquire a test utterance for verification or recognition of a spoken word. The various types of microphones may include a carbon microphone, a dynamic (magnetic) microphone, a piezoelectric crystal microphone and an optical microphone, although the scope of the present invention is not limited in this respect. System 100 may be included as part of a mobile communication device.

Input device 102 may be any type of input device capable of receiving the reference and test signal. Input device 102 may possibly be capable of conditioning the input and preparing it for analog to digital conversion. ADC 104 may convert the analog signals to digital signals and may include voice-encoding functionality. The digital signals may be delivered to processing unit 106 for various processing procedures, such as, for example, generating and adapting reference templates.

Although system 100 is illustrated with one processing unit 106, it should be understood that unit 106 may comprise several processing elements and/or may comprise one or more digital signal processors (DSP's).

System 100 may further comprise a memory unit 108 to store processing instructions and data for use by processing unit 106 and another memory unit 110 to store reference templates generated by processing unit 106. It should be understood that the present invention is not limited to two memory units and the system may comprise any number of memory units. For example, a single memory unit with different allocation to applications and/or templates, if desired.

System 100 may further comprise a scoring unit 112 and a decision unit 114. Scoring unit 112 may produce a score, which indicates the degree of the similarity of a reference template and the test utterance. A lower score may indicate a better match between the test utterance and a reference template. According to some embodiments of the present invention, scoring unit 112 may be a dynamic time warping (DTW) scoring unit. Decision unit 114 may reject or accept a spoken word (the test utterance) based on the score. It should be understood that the present invention is not limited to having separate decision and scoring units and the decision unit and/or the scoring unit may be embedded in the processing unit. two memory units and the system may comprise any number of memory units.

Figure 2:
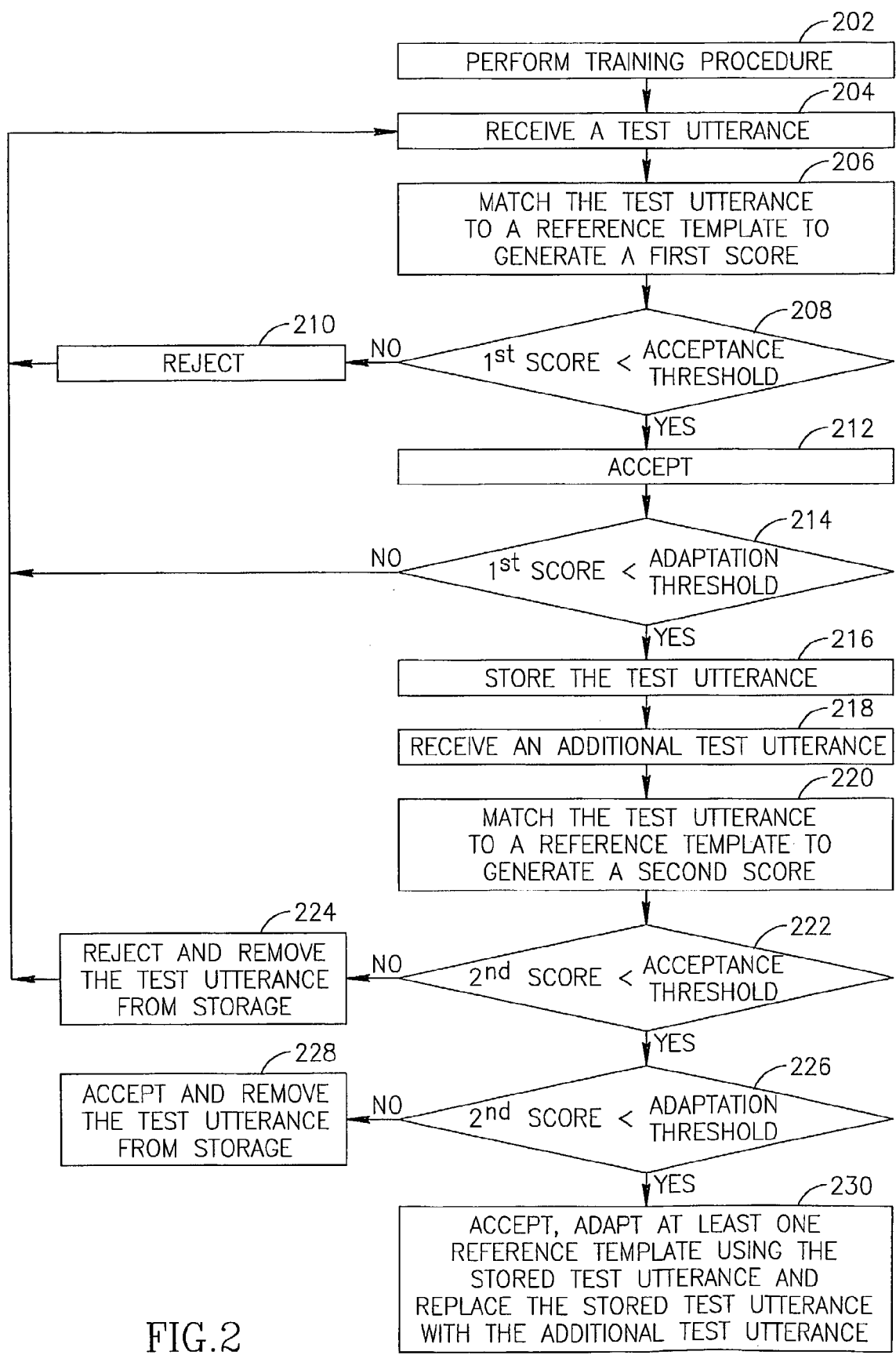
FIG. 2 is a flowchart diagram of a method for selecting conditions for speaker adaptation of reference templates according to some embodiments of the present invention.

Reference is now made to FIG. 2, which is a flowchart diagram of a method for selecting conditions for speaker adaptation of reference templates according to some embodiments of tie present invention. For clarity, FIG. 2 and the discussion below relates to a speaker verification process. However, it should be understood to a person skilled in the art that other embodiments of the present invention are applicable to other process, such as, for example, speech recognition and speaker identification.

According to some embodiments of the present invention, the method may be performed by a mobile communication device that includes, for example, system 100 of FIG. 1 to verify a user's identity. The method may also be implemented, for example, in an application for securing private information in cellular communications.

Although the operations of FIG. 2 are illustrated and described as separate operations, it should be noted that one or more of the individual operations may be performed substantially concurrently. Further, some of the operations may be performed in a different order.

In operation 202, a training procedure may be performed to generate training data associated with one or more reference templates. The training data may comprise feature vectors generated from one or more target words (the speech reference utterances) spoken by a user. The feature vectors may be represented, for example, by Cepstral coefficients. Upon the completion of operation 202, one or more reference templates are generated and stored in system 100. A reference template may include, for example, between one hundred and three hundred frames, although the scope of the present invention is not limited in this respect.

In the exemplary process described below, two or more reference templates are used for a target word. The use of more than one reference template may reduce the probability of failing to verify the identity of a speaker that should have been properly verified. In these embodiments, a training set may comprise a set of reference templates representing a single class, such as, for example, a specific spoken word of a specific user. When the size of the training set is large, statistical models such as Hidden Markov models, may be conventionally used. When the training set is small, for example between two and four reference templates, template models, such as DTW may be used. During the speech recognition or the speaker verification process, the distances between the reference templates and a test utterance may be computed.

In operation 204, a test utterance is received. The test utterance may be used to establish whether a particular user is authorized to use the device, store private information in the device or access accessible information through the device. The test utterance may be one or more predetermined words or phrases, which may be spoken in response to a prompt from the device.

In operation 206, processing unit 106 may match the received test utterance to one or more reference templates and scoring unit 112 may generate a score for each match. Then, in operation 208 the score may be compared to a predetermined acceptance threshold to check whether a predetermined acceptance criterion is satisfied. If the score indicates that the test utterance exceeds the threshold, the utterance is rejected (operation 210) and the system then may wait until speech input device 102 may detect a further test utterance.

If the score indicates that the test utterance is below the acceptance threshold, the test utterance may be a good match for one of the target words and the system may accept the test utterance as that target word (operation 212). For example, the user's identity may be verified or the user may be allowed access to certain private information within the device.

In operation 214, the score may be compared to a predetermined adaptation threshold to check whether a predetermined adaptation criterion is satisfied. The adaptation threshold may be stricter than the acceptance threshold for a better match between the test utterance one or more reference templates. If the score indicates that the test utterance exceeds the adaptation threshold, no further action is taken and the system then may wait until speech input device 102 may detect a further test utterance.

If the score indicates that the test utterance is below the adaptation threshold, the test utterance may be stored in a storage (not shown) or in memory 108 for possible future adaptation of the reference templates (operation 216). In operation 218, an additional test utterance is received. The test utterance of operation 218 may be received by speech input device 102 within a period of between seconds and weeks from storing of the test utterance received at operation 204. In operation 220, processing unit 106 may match the received test utterance to one or more reference templates, and scoring unit 112 may generate a second score for each match. Then in operation 222, the second score may be compared to the predetermined acceptance threshold to check whether the predetermined acceptance criterion is satisfied. If the second score indicates that the additional test utterance exceeds the threshold, the second test utterance is rejected and the stored test utterance is removed from the system (operation 224). The system then may wait until speech input device 102 may detect a further test utterance.

In operation 226, the second score may then be compared to the predetermined adaptation threshold to check whether the predetermined adaptation criterion is satisfied. Even when the second score indicates that the test utterance exceeds the adaptation threshold, the additional test utterance may be a good match for one of the target words. Therefore, the system may accept the additional test utterance as a target word without adapting the template references. Then, the stored test utterance may be removed from the storage (operation 228). The system then may wait until speech input device 102 may detect a further test utterance.

If the score indicates that the additional test utterance is also below the adaptation threshold, the system may accept the additional test utterance as a target word and may adapt at least one reference template using the stored test utterance. Then, the stored test utterance may be replaced with the additional test utterance for possible future adaptation (operation 230).

It should be noted that the procedure described above may be equally applicable to statistical models, such as, for example, HMM and to templates models, such as, for example, DTW.

Figure 3:
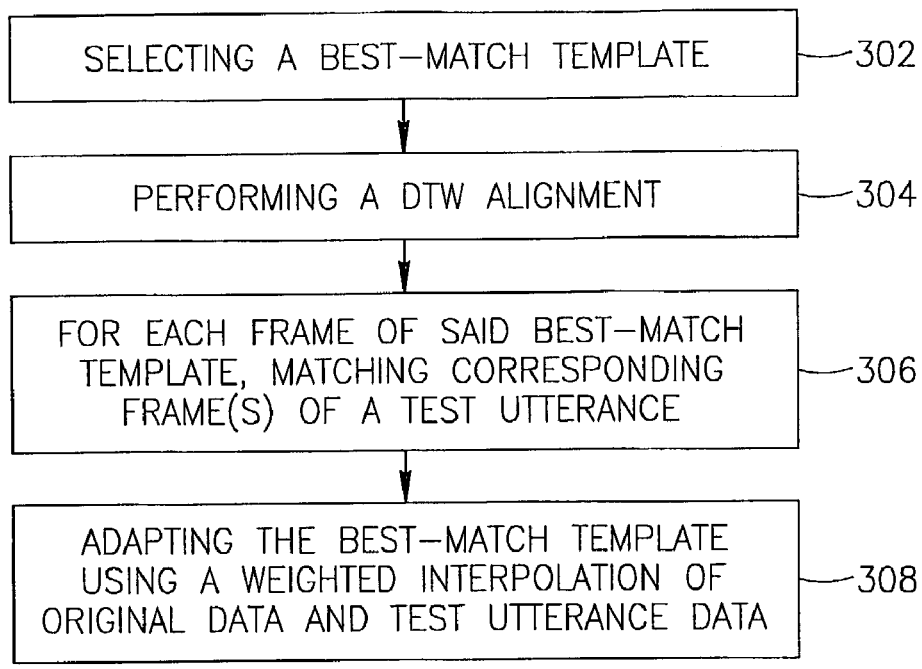
FIG. 3 is a flowchart diagram of a method for speaker adaptation of DTW reference templates according to some embodiments of the present invention.

Reference is now made to FIG. 3, which is a flowchart diagram of a method to adapt reference templates in a DTW process according to some embodiments of the present invention. In the exemplary embodiments described below, several reference templates of a training speaker are stored in memory 110. Firstly, in operation 302, processing unit 106 may select the reference template that is for example most similar to the stored test utterance (block 216 of FIG. 2) as a best-match template.

Then, in operation 304, processing Unit may perform a DTW alignment between the selected best-match reference template and the stored test utterance. Based on the alignment operation, for a frame of the selected reference template processing unit 106 may match one or more corresponding frames of the stored test utterance (operation 306). Then processing unit 106 may replace original data within the frame of the selected reference template with a weighted interpolation of the original data and data within one or more of the corresponding frames of the stored test utterance (operation 308). Operations 306 and 308 may be performed on each frame of the selected reference template.

The interpolation method may be a vector interpolation as illustrated below. Given two vectors X and Y, and a weight factor w, the weighted interpolation may be $wX+(1-w)Y$. The weight factor may depend on the application and may be determined according to a validation set.

Figure 4:
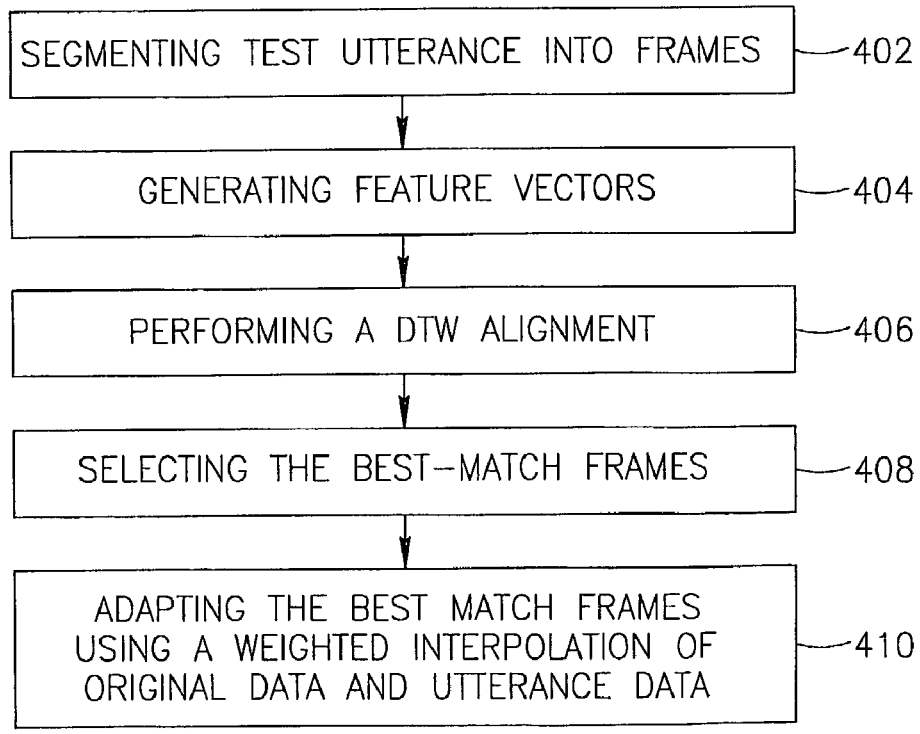
FIG. 4 is a flowchart diagram of a method for speaker adaptation of DTW reference templates according to some embodiments of the present invention.
Figure 5:
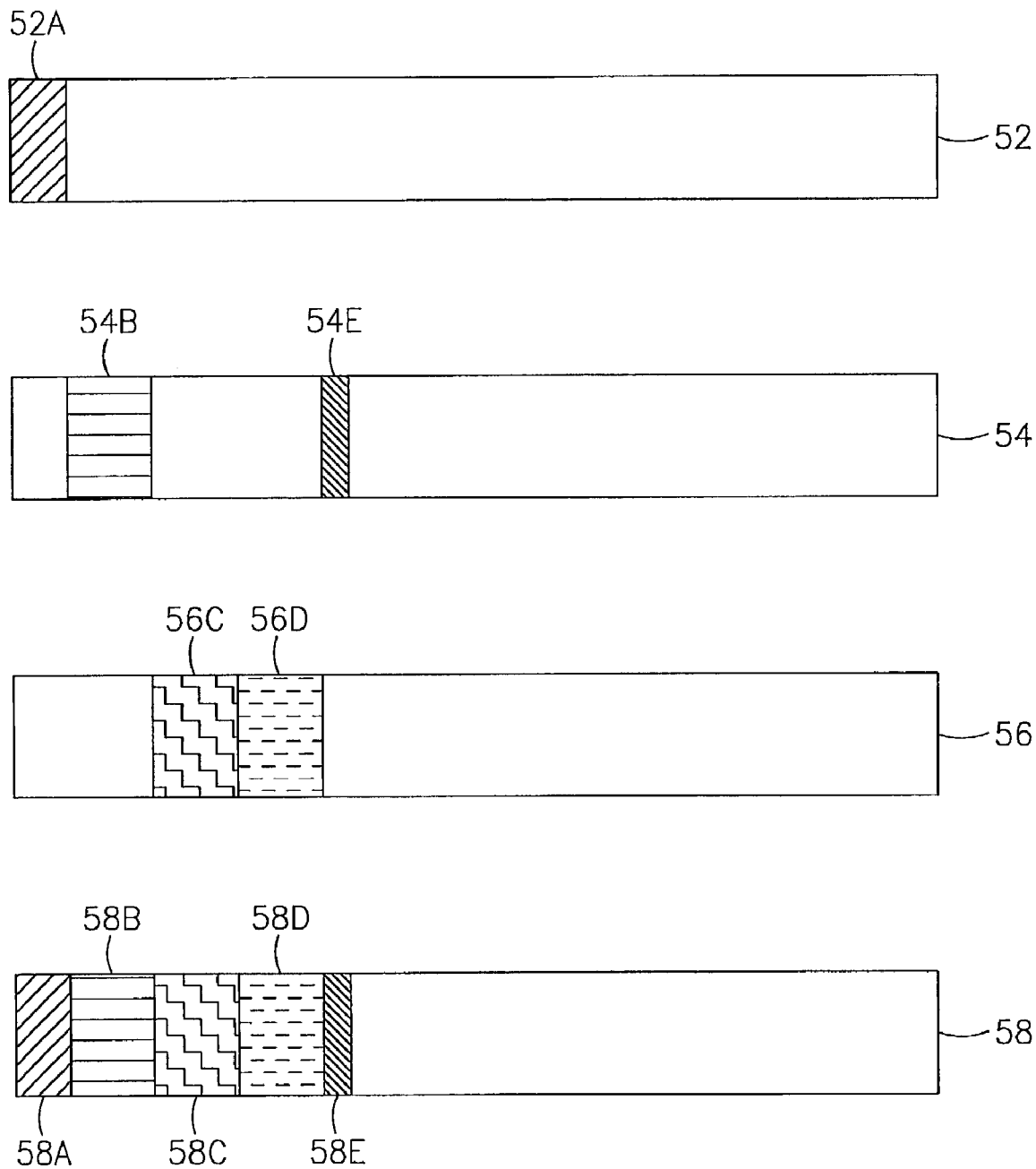
FIG. 5 is an illustration of the adaptation process of FIG. 4.

An alternative method of adapting reference templates is described hereinbelow with respect to FIGS. 4 and 5. Reference is now made to FIG. 4, which is a flow chart diagram of a method to adapt reference templates in a DTW process according to some embodiments of the present invention. Reference is additionally made to FIG. 5, which is an illustration of the adaptation process of FIG. 4.

The method described below is for adapting DTW templates. In the exemplary embodiment below, a set of three reference templates for a single target word or phrase is stored in memory 110. However, it should be understood to a person skill in the art that any other number of templates suitable for the DTW process is within the scope of the present invention.

In operation 402, the test utterance may be segmented into frames, which may have a predetermined length. The number of frames of a test utterance may range, for example, between one hundred and five hundred, although the scope of the present invention is not limited in this respect. It should be noted that the frames may include silence or noise, and that the endpoints of the test utterance are not necessarily known.

In operation 404, spectral coefficients may be extracted from the frames to generate one or more feature vectors for the frames of the test utterances. The feature vectors may comprise Cepstral coefficients, or other coefficients that represent the spectral content of a frame. At the completion of operation 404, a sequence of feature vectors representative of the test utterance may be generated and may be stored in system 100.

In operation 406, a set of multiple reference templates 52, 54, and 56 may be aligned using an alignment algorithm. For example, a DTW algorithm may be used to align templates 54 and 56 to reference template 52 using an original DTW distance measure. A valiant of the DTW process may be used to match the test template 58 and the reference templates. It should be understood that the test template may comprise the test frames which include the test utterance but may exclude test frames of noise and/or silence. Operations 402, 404 and 406 described above and additionally operations 408-410 described below may be performed by processing unit 106.

In operation 408, one or more frames of the stored test utterance may be matched with a corresponding frame of each of the reference templates. The frame of the reference templates that has the lowest score may be selected, as a best-match frame for adaptation. Operation 408 may be performed for all the frames of the stored test utterance. For example, as is shown in FIG. 5, frame 58A of test template 58 may best match frame 52A of reference template 52. Similarly, frames 58B and 58E of test template 58 may best match frames 54B and 54E of reference template 54, and frames 58C and 58D of test template 58 may best matches frames 56C and 56D of reference template 56.

Then in operation 410, the original data within the selected best-match frame, such as, 52A, 54B, 54E, 56C and 56D are replaced with a weighted interpolation of the original data and data within the corresponding frame of the stored test utterance. Operation 410 may be performed for all of the selected best-match frames.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising: adapting a reference template stored in a computer-readable memory by replacing only a portion of existing data within said reference template with a weighted interpolation of said portion and corresponding data within a test utterance, wherein the reference template includes data indicative of physical characteristics of a voice of a person.

2. The method of claim 1, further comprising:
   comparing reference templates to said test utterance; and
   selecting for adaptation said reference template that is most similar to said test utterance.

3. The method of claim 1 further comprising:
   storing said test utterance before adapting the reference template.

4. A method comprising: adapting two or more reference templates stored in a computer-readable memory by replacing only corresponding portions of existing data within said reference template with a weighted interpolation of said corresponding portions and corresponding data within a test utterance, wherein each template includes data indicative of physical characteristics of a voice of a person.

5. The method of claim 4, wherein adapting said reference templates comprises:
   performing a dynamic time warp alignment between said reference templates and said test utterance;
   matching one or more frames of said test utterance to corresponding frames in each of said reference templates;
   selecting one of said corresponding frames that is most similar to said one or more frames of said test utterance as a best-match frame; and
   replacing original data within said best-match frame with a weighted interpolation of said original data and data within said one or more frames of said test utterance.

6. The method of claim 5 further comprising:
   repeating the operations of matching, selecting and replacing for other frames of said test utterance.

7. The method of claim 4 further comprising:
   storing said test utterance before adapting the reference templates.

8. A computer-readable storage medium having stored thereon instructions that, when executed by a computing platform, result in:
adapting a reference template by replacing only a portion of existing data within said reference template with a weighted interpolation of said portion and corresponding data within a test utterance, wherein the reference template includes data indicative of physical characteristics of a voice of a person.

9. The computer-readable storage medium of claim 8, wherein the instructions when executed further result in:
comparing reference templates to said test utterance; and
selecting for adaptation said reference template that is most similar to said test utterance.

10. An apparatus comprising:
a memory to store one or more reference templates, wherein each reference template includes data indicative of physical characteristics of a voice of a person; and
a processing unit coupled to said memory, said processing unit to adapt one or more of said reference templates using a test utterance by replacing only a portion of existing data within at least one of said reference templates with a weighted interpolation of said portion and corresponding data within said test utterance.

11. The apparatus of claim 10, wherein said processing unit is to replace original data within frames of more than one of said reference templates, with a weighted interpolation of said original data and data within one or more corresponding frames of said test utterance.

12. An apparatus comprising:
a crystal microphone to receive a test utterance;
a memory to store one or more reference templates, wherein each reference template includes data indicative of physical characteristics of a voice of a person; and
a processing unit coupled to said memory, said processing unit to adapt one or more of said reference templates by replacing at least part of existing data within at least one of said reference templates with a weighted interpolation of said existing data and corresponding data within a test utterance;
wherein adapting said one or more reference templates comprises:
performing a dynamic time warp alignment between one of said reference templates and said test utterance; and
replacing only a portion of original data within said one reference template with a weighted interpolation of said portion and data within one or more corresponding frames of said test utterance.

13. The apparatus of claim 12 wherein said processing unit is to perform a dynamic time warp alignment between said reference templates and said test utterance.

14. The apparatus of claim 12, wherein said processing unit is to replace original data within frames of more than one of said reference templates, with a weighted interpolation of said original data and data within one or more corresponding frames of said test utterance.

15. A computer-readable storage medium having stored thereon instructions that, when executed by a computing platform, result in:
adapting two or more reference templates by replacing only corresponding portions of existing data within said reference templates with a weighted interpolation of said corresponding portions of existing data and corresponding data within a test utterance, wherein each reference template includes data indicative of physical characteristics of a voice of a person.

16. An apparatus comprising:
a memory to store a plurality of reference templates, wherein each reference template includes data indicative of physical characteristics of a voice of a person; and
a processing unit coupled to said memory, said processing unit to adapt at least two of said plurality of reference templates using a test utterance by replacing only corresponding portions of existing data within said at least two of said plurality of reference templates with a weighted interpolation of said corresponding portions of existing data and corresponding data within said test utterance.

17. An apparatus according to claim 16, further comprising:
a crystal microphone to receive said test utterance.

18. The method of claim 1, wherein adapting said reference template comprises:
performing a dynamic time warp alignment between said reference template and said test utterance; and
replacing original data within a frame of said reference template with a weighted interpolation of said original data within said frame and data within one or more corresponding frames of said test utterance.

19. The computer-readable storage medium of claim 8, wherein adapting said reference template comprises:
performing a dynamic time warp alignment between said reference template and said test utterance; and
replacing original data within a frame of said reference template with a weighted interpolation of said original data within said frame and data within one or more corresponding frames of said test utterance.

20. The apparatus of claim 10, wherein the processing unit is configured to:
perform a dynamic time warp alignment between one of said reference templates and said test utterance, and
replace original data within a frame of said one reference template with a weighted interpolation of said original data within said frame and data within one or more corresponding frames of said test utterance.

* * * * *